(12) United States Patent
Pettersson et al.

(10) Patent No.: US 10,607,163 B2
(45) Date of Patent: Mar. 31, 2020

(54) LOD WORK PACKAGE

(71) Applicant: HEXAGON TECHNOLOGY CENTER GMBH, Heerbrugg (CH)

(72) Inventors: Bo Pettersson, Luxembourg (LU); Håkan Andersson, Karlskoga (SE); Jonas Wedin, Karlskoga (SE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 15/679,127

(22) Filed: Aug. 16, 2017

(65) Prior Publication Data

US 2018/0053130 A1    Feb. 22, 2018

(30) Foreign Application Priority Data

Aug. 16, 2016 (EP) ..................... 16184398

(51) Int. Cl.
*G06Q 10/06* (2012.01)
*G06Q 50/08* (2012.01)
(Continued)

(52) U.S. Cl.
CPC . *G06Q 10/06311* (2013.01); *G06Q 10/06316* (2013.01); *G06Q 10/06395* (2013.01); *G06Q 10/06398* (2013.01); *G06Q 10/063114* (2013.01); *G06Q 10/103* (2013.01); *G06Q 50/08* (2013.01); *G06T 7/001* (2013.01); *G06T 19/003* (2013.01); *G06T 19/006* (2013.01);
(Continued)

(58) Field of Classification Search
None
See application file for complete search history.

(56) References Cited

U.S. PATENT DOCUMENTS

2013/0155058 A1    6/2013  Golparvar-Fard et al.
2013/0169681 A1*   7/2013  Rasane .................. G06T 19/006
                                              345/633
(Continued)

FOREIGN PATENT DOCUMENTS

EP    2 629 210 A1    8/2013
EP    3 054 404 A1    8/2016
EP    3223208 A       9/2017

OTHER PUBLICATIONS

Crickard ("Revit to PDF an Interactive Model Viewer", 2011, https://www.augi.com/articles/detail/revit-to-pdf-an-interactive-model-viewer) (Year: 2011).*
(Continued)

*Primary Examiner* — Xin Sheng
(74) *Attorney, Agent, or Firm* — Maschoff Brennan

(57) ABSTRACT

A construction site management system with building information modelling (BIM) functionality. The system includes a server for maintenance of a three-dimensional gross model of a construction site, a mobile device connected to the server, wherein the server is configured to derive a three-dimensional net model from the gross model based at least in part on a work package, the work package being assigned from the server to the mobile device and comprising references to locations within the gross model, wherein the mobile device is configured to retrieve the net model from the server and provide the net model on a screen as a graphical user interface (GUI).

23 Claims, 3 Drawing Sheets

(51) Int. Cl.
 *G06Q 10/10* (2012.01)
 *G06T 7/00* (2017.01)
 *G06T 19/00* (2011.01)

(52) U.S. Cl.
 CPC ............ *G06T 2207/10028* (2013.01); *G06T 2207/20076* (2013.01); *G06T 2207/30132* (2013.01)

(56) References Cited

U.S. PATENT DOCUMENTS

| | | | | |
|---|---|---|---|---|
| 2016/0171633 A1* | 6/2016 | DeWalt | ................ | G06Q 50/08 705/7.15 |
| 2016/0196687 A1* | 7/2016 | Alpert | ................ | G06T 17/05 345/419 |
| 2017/0286782 A1* | 10/2017 | Pillai | ................ | B60W 40/08 |

OTHER PUBLICATIONS

SteenSunesen ("What openBIM Does for You—buildingSMART in Four Minutes", 2014, https://www.youtube.com/watch?time_continue=182&v=2m IL99WOzQ) (Year: 2014).*
Simplicity ("PM Coordinator V6—Users Guide", 2010) (Year: 2010).*
Hexagon, "Hexagon launches HxGN SMART Build, a pioneering enterprise construction management software solution", Published on Jun. 14, 2016, Stockholm, Sweden, accessed at http://vp208.alertir.com/afw/files/press/hexagon/201606138812-1.pdf, accessed on Jun. 29, 2017, p. 1.
Hexagon, "HxGN SMART Build—Clarity. Connectivity. Simplicity. From the Ground Up", Uploaded on Jun. 12, 2016, accessed at https://www.youtube.com/watch?v=AZzsz8mG-N8&feature=youtu.be, accessed on Jun. 29, 2017, pp. 3.
Extended European Search Report dated Nov. 18, 2016 as received in Application No. 16184398.2.

* cited by examiner

LOD WORK PACKAGE

FIELD OF THE INVENTION

The present invention relates to a construction site management system, method, and computer programme product. More particularly, the present invention pertains to a building information modelling (BIM) system e.g. for the management of a construction site, and to a method for operation of said system.

BACKGROUND

In the art of general construction work such as building construction and civil engineering, planning, progress observation, as well as instruction and documentation distribution are important key factors. In many instances, those aspects are getting more and more complex and dynamic, in particular due to the many parties and data involved, fluctuating human and/or objective resources, increased complexity and amount of the interim or end results, tighter schedules, increased costs of human resources, etc. Work that was formerly planned and observed by one manager is nowadays too complex for a single person and splitting the jobs and assigning them to multiple people often fails due to a mismanagement of interfaces.

Therefore, it has been tried to expand automation and computerisation in this technical field. In the art of building construction EP 2 629 210 is giving an example of a so called BIM (building information model) system.

In view of the demand for flexible and efficient usage of executing entities, and in view of the demand for increased efficiency or often practiced real time replacement and spare management of structural and human resources, methods and systems going further than the standard human usage of computer and mobile devices are demanded.

As being common nowadays, construction sites are managed with help of computer based systems wherein data of various kinds are collected on servers and are shareable throughout a user network.

In particular, said systems coordinate and spread work orders or so called work packages as well as measuring instructions through the network to the workers and craftsmen who wirelessly receive the information from the server with their mobile devices.

Advanced construction site systems also provide an overview map or a 3D model of the construction site on a displaying device of the craftsmen, e.g. for navigating or locating points-of-interest. Since this overview map is being managed centrally on the server, it is possible to provide a model to the network which is always updated, for example by a site manager who is implementing changes in the structure of the building. Depending on the size of the construction site (and hence, the building model) and depending on the detailedness of the structure, this updated model tends to reach data volumes which are going to the limits of the signalling technology and/or the presentational capabilities of the mobile device.

SUMMARY

It is therefore an object of the present invention to provide an improved construction site management system.

This improvement is achieved by the system according to claim 1, the method according to claim 6, the computer programme product according to claim 12, and/or the claims depending on claim 1, 6 or 12.

This improvement is also achieved by the system according to claim 13, and/or the claims depending on claim 13.

Construction sites are often managed by spreading individual work packages digitally over a network to the user. From the work package, the user can find as much information as is needed to fulfil certain tasks, such as the place within the construction site, where a task is to do. Also it may comprise information on how much time is available or needed for a specific task, who and/or what is needed for the tasks, and where to find a respective person or tool. Furthermore, a work package may also comprise manual instructions, tips, warnings, or other annotations related to a task.

According to the invention, these work packages are stored on a server which is connected to mobile client devices over a network. By the devices, the users (craftsmen, workers, or other staff) can be reached immediately and in real-time.

The server furthermore may store a three-dimensional model of the construction site with a highly detailed texture. That means, to a specifically high level of detail, the form of the construction site (e.g. building) is saved with its coordinates and vectors in a computer aided design (CAD) model. Such details may comprise windows, doors, room edges, floor shapes, and/or stairways. Other typical details possibly comprised are wires and pipes (within a wall), outlets, sockets, conduits. If the construction site is already in an advanced status, the 3D model may also comprise manufactured or installed elements, like furniture, walls, tiles, parquet, plaster, carpets, windows, wallpaper, inventory, locks, switches, etc.

The system according to the invention provides a "trimmed" 3D model that is focused on what is relevant to the individual user, and does this by processing the full-detail model on the server depending on an analysis of a work package that is assigned to the individual.

What results, is a model that is detailed only at places where the user needs information. Other parts of the construction site are still comprised, but in a less detailed manner. By this data preparation, the data is reduced to what is individually relevant.

The data volume to be transmitted from the server to mobile devices, hence, is at an optimised level and the requirements to the (graphic) processor of the mobile device are kept as low as possible. Mobile devices used at a construction site may typically be controllers, tablets, smart phones, and the like.

By the graphical user interface (GUI) of the mobile device, only the relevant places within the construction site are displayed in a detailed manner. If not a full room, but only part of a room is relevant to the user, only said part may be displayed in full detail. For a correct perspective view, the mobile device may have a sensor (e.g. gyroscope, compass, etc.) in order to change the alignment on the display of the mobile device according to the orientation of the mobile device. This feature enables guiding the user through space by orienting the device.

The places not relevant for the user of the mobile device are displayed less detailed, for example like a simple part-transparent grid, or blurred.

Optionally, further information in the surroundings (so in the non-relevant space) may be displayed in case they matter to the user of the mobile device. For example, the GUI may guide ("navigate") the user through a building with arrows or highlighting of corridors and stairways in order to let him find the room where he supposed to proceed with his current work order. In another example, a room (different from the one he supposed to proceed with his current work order in) is shown or highlighted in order to pick up tools or instruments or a colleague, which/who may be supportive for the work order. Also, areas may be highlighted which the user should not enter, for example because of a hazard or a situation where disturbance is to be avoided.

The server may be designed for a "learning capability" regarding the end-user's skill. This learning mechanism comprises data gathering and data analysis, as well as tailor-made reaction regarding the provision of information from the construction site management server to the end-user.

Herein, the competence level of a user is automatically tracked by the system with means of several collected information. The competence level is maintained on the server, which means it may be updated in real-time and fetched at any time for data processing. The system is then able to "learn" (autonomously find correlations, rules, etc.) what the current competence level (both long term and short term) of an individual user is and how to best response to the users is which situation.

The information for assessing the competence level is gathered by a mobile device the user has with him for managing his daily work at the construction site. In this device, he is reporting to the server what has been finished, and how it has been finished (function checks, measurements, photo report). In a further embodiment, also "fine" details like the user's behaviour when using the mobile device is recorded by sensors of the device (e.g. accelerometer, time measurements to capture the capacity of reaction, light sensor, front camera).

With the "learnt" skill levels, the construction site system can adapt the detail or amount of the instructions. For example, a relatively inexperienced user will get a more detailed work order or instruction plan with more and/or more detailed instructions. Also, the choice of technical terms within the instructions may be adapted to the user. If a work check is scheduled after a work package has been finished, the requirements or amount of checks (e.g. test or measurement) may be adapted.

Distinguished from monitoring the professional skills, skills related to the usage of the mobile device may also be recognised and tracked. For example, it is detected if the user acts non-consistent or struggles with the usage, and by that will be able to adapt the information on the screen (not only on the mobile device of the user, but also on measuring instruments or tools with digital control). As a result, e.g. the size of the text or the simplicity of the GUI may be increased.

The tracked professional skills can for example be used to adapt the instruction level based on what the system already monitored in the past. The system has access to recordings of the quality and quantity history of work packages formerly accomplished by the specific user (according to a method known from European Patent Application 16 161 770). Therefore, by means of analysed "weaknesses" of the user, the system allows for adapting the information provided on the mobile device.

With help of categorising or tagging the single tasks or the whole work packages, e.g. with parameters, a similarity between single tasks or work packages can be assessed. This means, even the user did not accomplish the very same kind of task in the past, the system may judge upon a potential similarity between the task to do and a task formerly accomplished, whether a customised modification of the instructions is needed or not.

Depending on the user's experience, not only the instructions but also a possible self control (quality check) after finishing a task or work package may be tailored. In case of a less experienced worker, the system may request him to check in more detail or more often, if the work has been done satisfactorily. This can even go as far as a live-streaming of his work performance, e.g. with a camera of his mobile device, wherein at "the other end of the line" a construction site manager or other professional is supervising the work process.

The "learning process" of the system is not limited to the skill levels of workers. With a self control system according to the teachings of European Patent Application 16 161 770 knowledge may be as well gathered regarding production/construction criteria. This is achieved by assessing the checking results under several aspects. For example, while aware of the materials that have been used for a certain construction, conclusion may be drawn such that in the future a specific material combination is preferred or not to be used anymore. Also considered in this case may be the environmental circumstances like humidity and temperature. The system may also learn, e.g. by a parameter matching algorithm, that specific criteria combination are particularly beneficial or disadvantageous. For example, user A is planned to perform task B with tool C at a time D under a temperature E. Each of the parameters A, B, C, D, and E are considered when retrieving a server knowledge database and searching for similar history data. If the parameter combination has been unfavourable in the past, the system may change the parameters by trying to find a more advantageous combination. In terms of artificial intelligence, the system may set up rules for performing the work packages, and output accordingly beneficial combinations of parameters as well as level-of-details of the instructions or manuals.

The invention relates to a construction site management system with building information modelling (BIM) functionality, comprising a server for maintenance of a three-dimensional gross model of a construction site, a mobile device connected to the server, wherein the server is configured to derive a three-dimensional net model from the gross model based at least in part on a work package, the work package being assigned from the server to the mobile device and comprising references to locations within the gross model, wherein the mobile device is configured to retrieve the net model from the server and provide the net model on a screen as a graphical user interface (GUI).

In one embodiment of the construction site management system according to the invention, the net model comprises detailed data of the locations referenced to the work package. The data particularly are renderings, 3D coordinates, lines, forms, objects, shapes and/or contours as known from CAD (computer aided design) models.

In another embodiment of the construction site management system according to the invention, the net model comprises detail-reduced data of the construction site apart from the locations referenced to the work package. "Detail-reduced" may for example mean "with a smaller resolution" or "faded" or "blurred" or "with a lighter colour".

In another embodiment of the construction site management system according to the invention, the server is configured to add attributes to the net model, the attributes comprising references to locations within the net model.

In another embodiment of the construction site management system according to the invention, the attributes are one or more of: instructions, manuals, notes, warning signs, accentuations, and graphical animations.

The invention also relates to a method for operation of a building information modelling (BIM) functionality in a construction site management system, wherein the method comprises providing by a server a three-dimensional gross model of a construction site, deriving a three-dimensional net model from the gross model, based at least in part on a work package assigned to a mobile device, the work package comprising references to locations within the gross model, providing on the mobile device the net model as a graphical user interface (GUI) on a screen of the mobile device.

In one embodiment of the method according to the invention, deriving the net model is carried out with the server or the mobile device.

In another embodiment of the method according to the invention, the net model comprises detailed data of the locations referenced to the work package.

In another embodiment of the method according to the invention, the net model comprises detail-reduced data of the construction site apart from the locations referenced to the work package.

In another embodiment of the method according to the invention, the method further comprises the step: adding attributes to the net model by the server, the attributes comprising references to locations within the net model.

In another embodiment of the method according to the invention, the attributes are one or more of: instructions, manuals, notes, warning signs, accentuations, and graphical animations.

The invention also relates to a computer programme product comprising programme code which is stored on a machine-readable medium, or being embodied by an electromagnetic wave comprising a programme code segment, and having computer-executable instructions for performing, in particular when run on a server of a construction site management system according to the present invention, the steps of a method according to the present invention.

Alternatively or additionally the intention relates to a construction site management system for providing instructions by a server for a mobile device of a worker on a construction site, the instructions relating to work to be done by the worker, in particular at least one of a work package, a check-up and a measuring task, wherein the server is configured to retrieve user parameters from the mobile device, the user parameters relating to work packages carried out by the worker, update a user database based at least in part on the user parameters, generate the instructions with a level-of-detail which is based at least in part on the updated user database, and wherein the mobile device is configured to retrieve the instructions from the server.

In one embodiment of the construction site management system for providing instructions by a server for a mobile device of a worker on a construction site according to the invention, the server is configured to obtain stem user parameters which are stored on the server or retrieved from the mobile device, the stem user parameters relating to a basic qualification level of the worker, and generate the instructions additionally based on the stem user parameters.

In another embodiment of the construction site management system for providing instructions by a server for a mobile device of a worker on a construction site according to the invention, the server is configured to retrieve device parameters from the mobile device, the device parameters relating to sensor data collected with the mobile device and based at least in part on the behaviour of the worker, and generate the instructions additionally based on the device parameters.

BRIEF DESCRIPTION OF DRAWINGS

In the following, the invention will be described in detail by referring to exemplary embodiments that are accompanied by figures, in which.

DETAILED DESCRIPTION OF THE INVENTION

Figure 1:
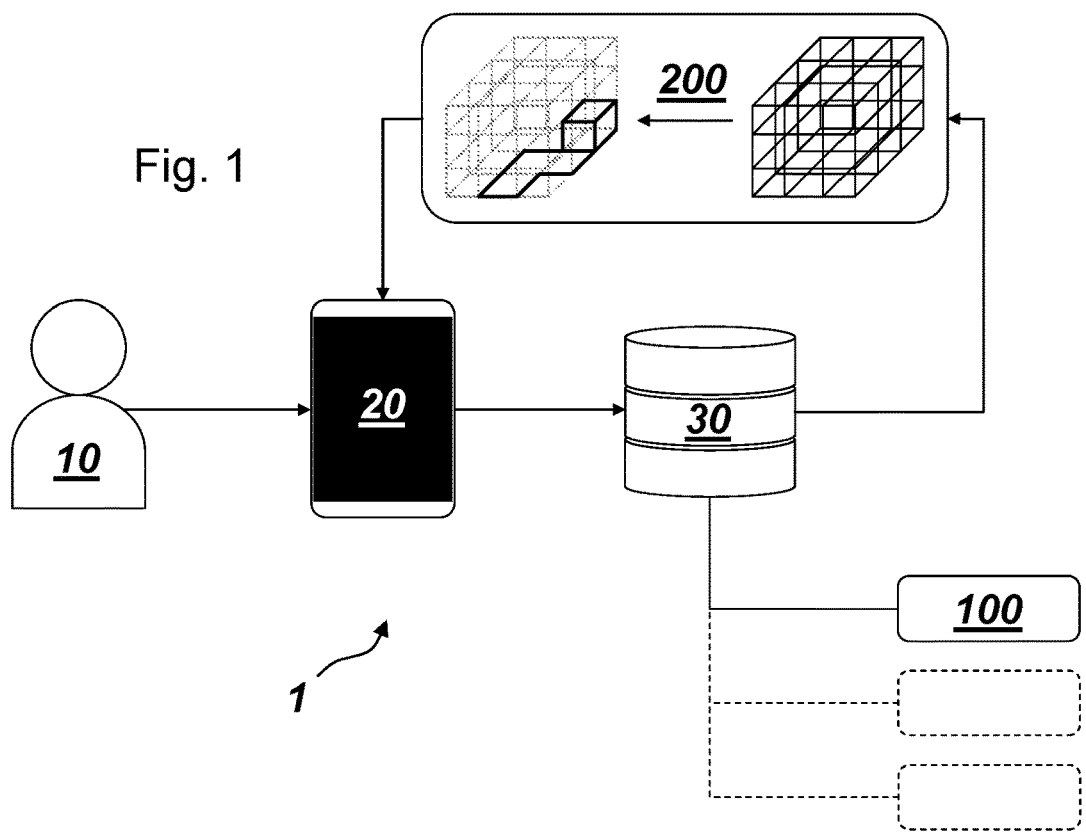
FIG. 1: shows a block diagram of a building information modelling (BIM) functionality of a construction site management system in accordance with the invention.

FIG. 1 shows the simplified principle of a construction site management system 1 with building information modelling according to the present invention. When a user 10, who is e.g. a craftsmen, carpenter or construction worker, accesses the site management server 30 via his mobile device 20, in order to retrieve a work package 100, then he will be provided with a customised user interface by the server 30. The customised user interface is created in a process 200 which is at least in part subject to the work package 100. In the shown bubble representing the process 200 it is symbolically indicated that out of a whole construction site model (2D or 3D), a fitted model is processed which focuses on the features most relevant to the user 10. The process 200 may be dependent on more factors (indicated by the bubbles in dashed lines), e.g. parameters related to the mobile device 20 like sensor data (position, orientation, acceleration), or parameters related to the user 10 like qualification, experience, aptitude, time schedule.

Figure 2:
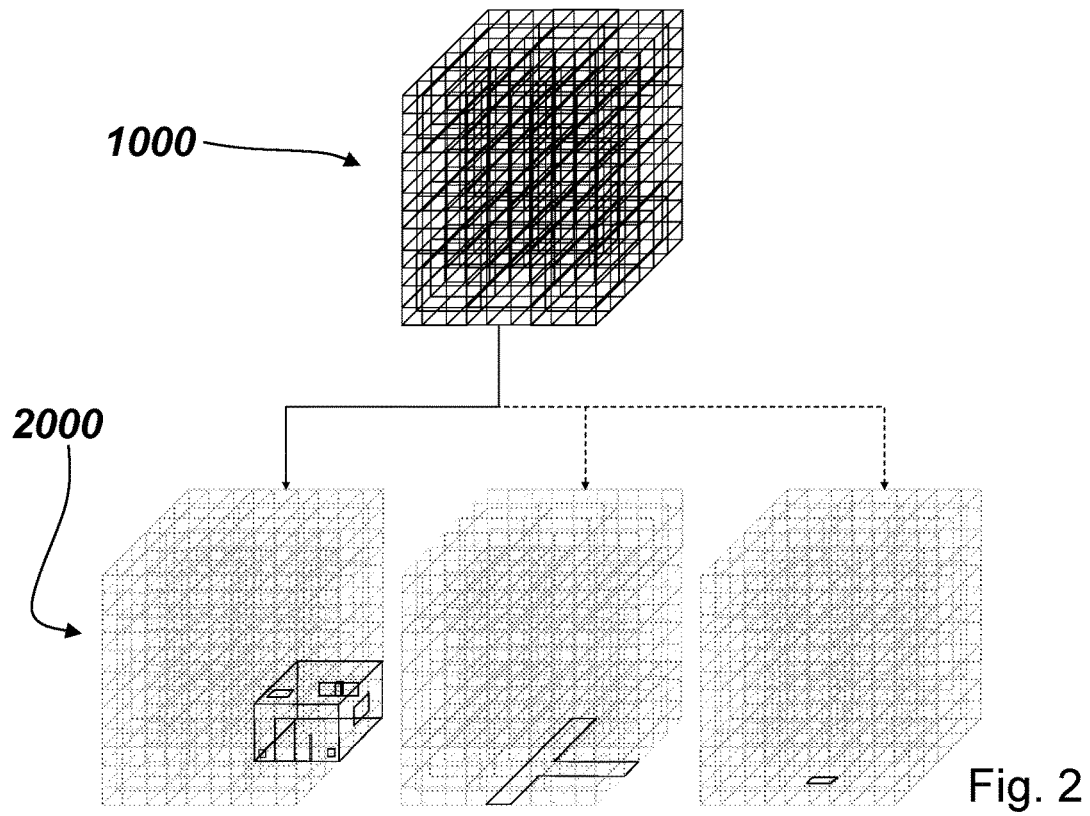
FIG. 2: shows a schematic diagram of a method according to the invention.

FIG. 2 shows symbolically that from the whole construction site model (gross model 1000), a selection of different layers may be derived for the customised model (net model 2000). On the left side, FIG. 2 shows a construction site model with a room being high in detail and/or resolution and the rest of the building (construction site) being low in detail (e.g. abstracted, blurred or just low in resolution). The models in the middle and on the right will play a role in FIGS. 3 and 4. The model in the middle comprises in high detail the path the user of the mobile device shall or can or possibly will take to reach the place where he supposed to work on the work package. To find the most suitable path, in particular, the current position of the mobile device may be used for the processing of this model. The model on the right comprises in high detail a place of interest (e.g. a danger-zone) which may be relevant to the user because it is located on the way between the user and the room. In the shown example in FIG. 2, the net model 2000 is to be understood as either one of the shown models alone, or two or three of the shown models combined.

Figure 3:
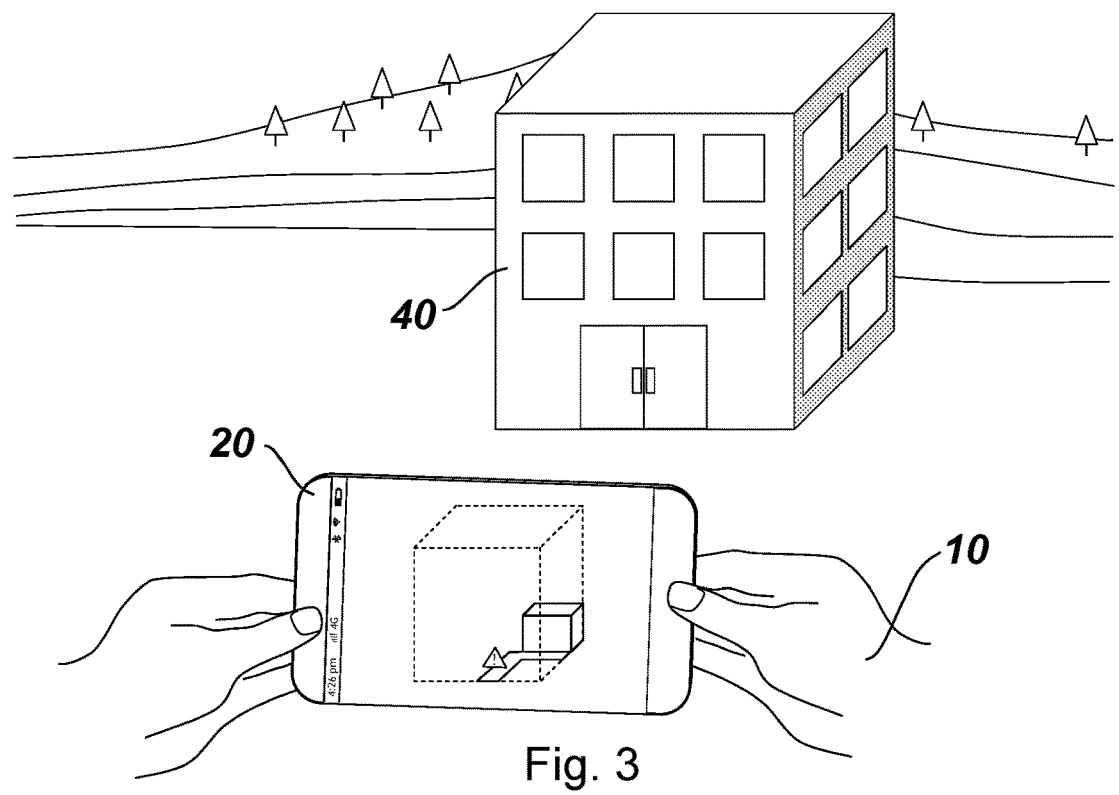
FIG. 3: shows an embodiment of a system according to the invention.
Figure 4:
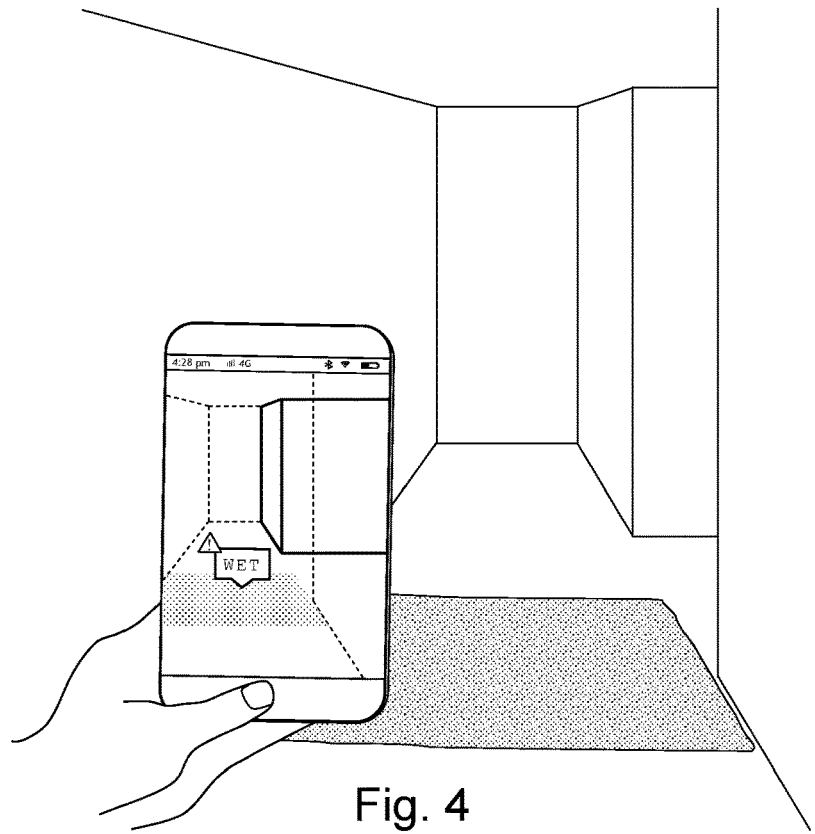
FIG. 4: shows an embodiment of a system according to the invention.
Figure 5:
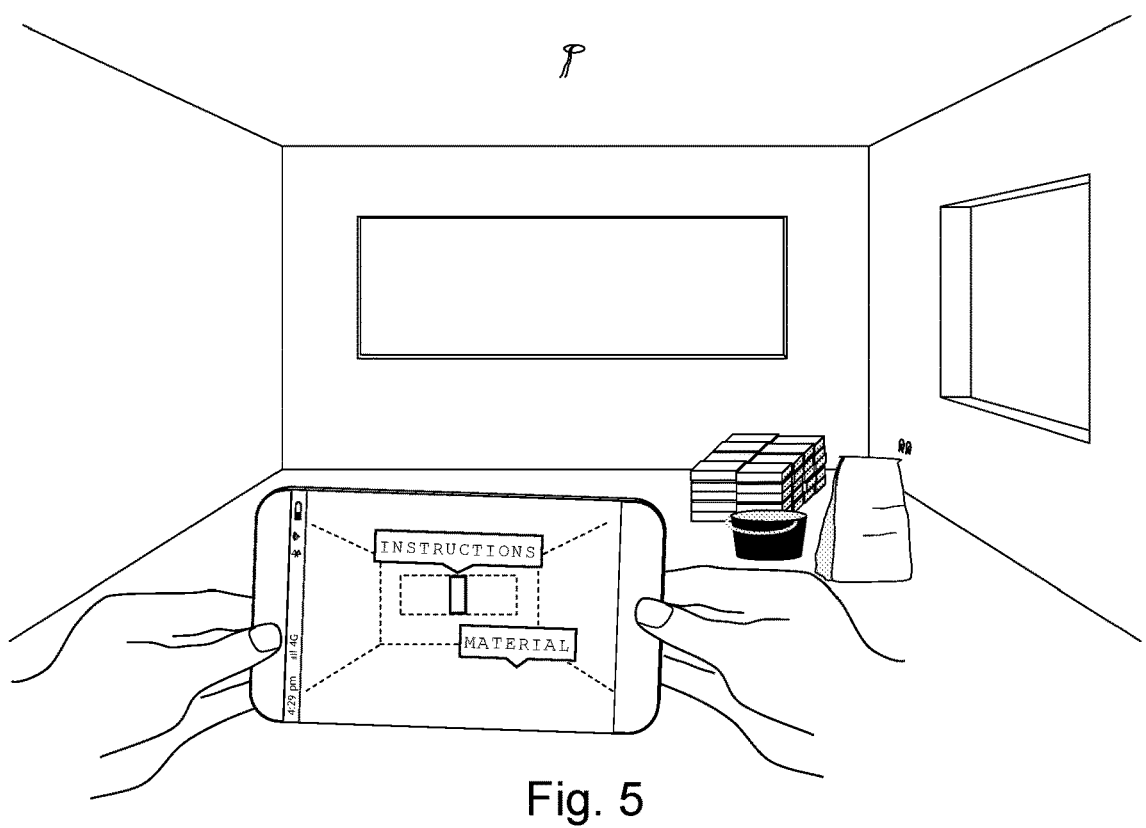
FIG. 5: shows an embodiment of a system according to the invention.

FIGS. 3, 4 and 5 show an exemplary embodiment of the invention.

FIG. 3 shows a user 10 holding a mobile device 20 that shows the house 40 in front of the user as a 3D model, the house being a construction site. The GUI displayed on the screen of the device 20 shows the building transparent and its contours in dashed lines. A room in the back right of the house, and the corridor from the front door to the room are displayed in full detail (indicated with full lines). The room displayed in detail on the device 20 is linked to the work package that is due for the user 10, who is a mason in this example. Also displayed is a warning triangle linked to specific coordinates in the shown 3D model. This warning point may be relevant to the user 10 because it is linked to either the path on which the user 10 will pass the point, but in other embodiments it may be relevant because it is linked to the work room itself. Particularly, the warning triangle may be tapped on the display of the device 20 in order to get more information about the reason of warning.

The shown view on the GUI may in particular be referenced to the environment regarding orientation and position so that the user 10 can find objects displayed on the screen by directing the device 20 towards it. For this feature, sensor means in the device 20 may be provided for determining position and orientation relative to the environment. This feature may be especially helpful, if the user 10 is inside a big building already trying to find a room. Also navigation arrows may be displayed to guide the user towards the destination.

FIG. 4 shows a situation in which the user 10 just stepped inside the house 40 and entered the corridor. He directs his mobile device 20 towards the room in which the work is waiting for him. The mobile device 20 being referenced to the local area shows the walls of the house 40 which are not relevant again transparent and only its contours with dashed lines. What is displayed in high detail, though, is the room in which the worker 10 supposed to perform his work package.

Regarding the warning point, FIG. 4 shows an exemplary GUI effect on the screen after approaching the point: A balloon appears indicating that the concrete on the floor is still wet, which is why persons need to take care at this place to not step into the concrete. By tapping on WET, more information about this warning point can be retrieved from the server. The triangle and the balloon are hovering over linked and anchored to the dotted area on the screen. Based on the orientation and position of the device 20, the perspective depiction on the screen will accordingly change. Instead of just showing the 3D model in the GUI, the device may also be designed to show the live view of its camera (such as known from smart phones or tablet PCs), with the 3D model and symbols overlaid on it (in the sense of "Augmented Reality").

FIG. 5 shows the mason 10 having arrived in the room where he finds the material to be used for his work order. The GUI of the management system software indicates the position of the material with a bubble linked to coordinates of the displayed 3D model. In the shown example the GUI has a 3D model referenced relative to the room which means it will automatically shift and rotate based on the movement of the user. Yet again, the 3D model may also be not referenced such that the user can rotate it manually and zoom in and out, e.g. by pinching on the screen. Also, the model may be overlaid on a live image of a camera of the device 20, such as known from the augmented reality principle.

Now that the user is inside the room, everything that is irrelevant with regard to his work package may be displayed in low details as well, just like before (FIG. 3 and FIG. 4) the part of the building that was not relevant. On the other hand, displayed in detail, the user finds e.g. construction elements to be built, tools and material to use, as well as instructions. In the shown example, a small retaining wall in the broad window must be built with the bricks lying on the floor. The user 10 finds a bubble INSTRUCTIONS which he may tap on to get the required information for his work package, like graphical construction manuals, animations, and technical details.

Figure 6:
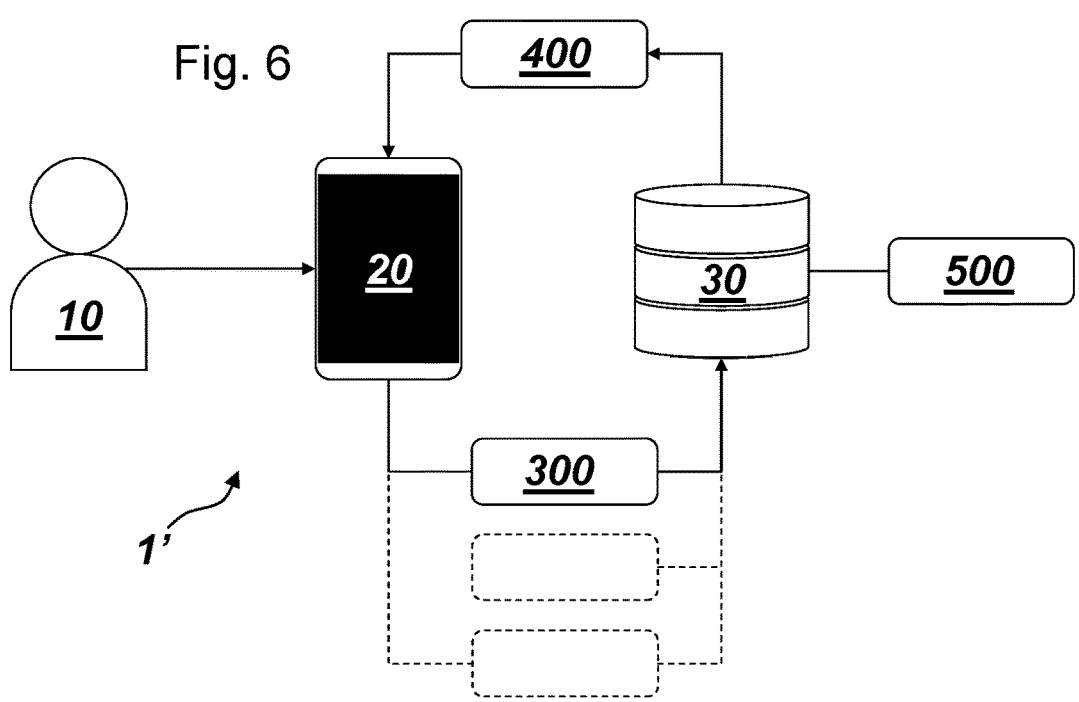
FIG. 6: shows an embodiment of a system according to the invention.

FIG. 6 shows the simplified principle of a construction site management system 1' with machine learning capability. A user 10, who is e.g. a craftsmen, carpenter or construction worker, has a mobile device 20 which has access to the site management server 30 in order to retrieve instructions 400 on measurements, check-ups or work orders. Such instructions 400 are customised (adapted) by the server 30 under knowledge of user parameters 300 which relate to the user 10 in terms of experience, qualification, aptitude, and/or quickness. With the user parameters 300, an user database 500 is maintained and continuously updated.

As is shown in FIG. 6, the user parameters 300 are gathered from (or recorded by) the mobile device 20, processed by the server 30 and stored in the user database 500. The user parameters 300 may as well be generated on the server 30, however they are still based on what information the user 10 is typing into his device 20, namely: reports on the quality and efficiency of finished work packages.

The customised instructions 400 may further be dependent on other parameters (indicated by the bubbles in dashed lines), for example:
  stem user parameters related to the user 10 in terms of experience, qualification, aptitude, quickness and/or time schedule, or
  device parameters related to sensor data (position, orientation, acceleration, time measurements) which are provided by one or more sensors of the mobile device.

The difference between user parameters 300 and stem user parameters is the fact that stem parameters are more or less "static" and are stored as a basis on the server right from the beginning (possibly in the database 500). Changes in stem user parameters may be e.g. an additionally accomplished continued education or the user's time schedule).

Device parameter may indicate in how far the worker is attentive or concentrated. This may be determined by time measurements (e.g. typing speed or reaction to notice to be confirmed) or sensor data during the regular use of the mobile device. Also, a testing app may be provided in order to specifically test the worker's mood.

Over time, with means of the user parameters 300, the worker's development is "learnt" by the system. Optionally, stem user parameters may also participate in this learning. Device parameters may also participate in this learning, however, preferably with a smaller weighting.

The parameters are updated frequently, particularly based on the data collected with the mobile device. Stem user parameters may be updated by the mobile device or by the server. There may be further parameters on which the generating of the customised instructions 400 depends.

The user parameters are based on the worker's reports about his done work packages, checks or measurements. User parameters regarding his experience, i.e. the acquisition of knowledge of what the user had worked on already and how well he did, are gathered by analysing his measuring results or checking results after each of his work packages (e.g. by a system according to European Patent Application EP 16 161 770). In this way, the skill level and efficiency level of the worker is tracked and updated in a database 500 on the server, and the instructions 400, accordingly, are adapted to the tracked and updated levels.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A construction site management system with building information modelling (BIM) functionality, the system comprising:
a server configured for maintenance of a three-dimensional gross model of a construction site, the gross model having a highly detailed texture, the server storing a work package, wherein the work package comprises relational information on a task to be performed, the work package being assigned from the server to a mobile device, the work package comprising references to locations within the gross model;
a mobile device connected to the server,
wherein the server is configured to derive a three-dimensional net model by processing the three-dimensional gross model based on an analysis of the work package, wherein the derived net model comprises varying degrees of detail, wherein the degrees of detail in the net model are related to the relational information on the task in the work package, wherein parts of the net model related to relational information in the work package appearing first are provided in greater detail than parts of the net model related to relational information in the work package appearing second, wherein appearing first and appearing second relate to an order of appearance according to which the task is to be fulfilled, wherein the derived net model comprises detailed data of the locations referenced to the work package and detail-reduced data of the construction site apart from the locations referenced to the work package,
wherein the mobile device is configured to retrieve the net model from the server and provide the net model on a screen as a graphical user interface (GUI).

2. The system according to claim 1, wherein the server is configured to add attributes to the net model, the attributes comprising references to locations within the net model.

3. The system according to claim 2, wherein the attributes are comprise one or more of:
instructions, manuals, notes, warning signs, accentuations, and graphical animations.

4. The construction site management system of claim 1 configured for providing instructions by the server for the mobile device, the mobile device being used by a worker on a construction site, the instructions relating to work to be done by the worker, the system comprising:
wherein the server is configured to:
retrieve user parameters from the mobile device, the user parameters relating to work packages carried out by the worker,
update a user database based at least in part on the user parameters, and
generate the instructions with a level-of-detail which is based at least in part on the updated user database,
wherein the mobile device is configured to retrieve the instructions from the server.

5. The system according to claim 4, wherein the server is further configured to:
obtain stem user parameters which are stored on the server or retrieved from the mobile device, the stem user parameters relating to a basic qualification level of the worker, and
generate the instructions additionally based on the stem user parameters.

6. The system according to claim 4, wherein the server is further configured to:
retrieve device parameters from the mobile device, the device parameters relating to sensor data collected with the mobile device and based at least in part on the behaviour of the worker, and
generate the instructions additionally based on the device parameters.

7. The system according to claim 1, wherein the work package includes information for construction tasks.

8. The system according to claim 7, wherein the work package includes information for time for the construction task.

9. The system according to claim 7, wherein the work package includes information for a person or tool to perform the construction task.

10. The system according to claim 7, wherein the work package includes information for manual instructions, tips, or warnings related to the construction task.

11. The system according to claim 1, wherein the server is configured to provide the net model to the mobile device, the net model being adapted through a learning process, wherein the learning process adapts the amount of details provided over time.

12. A method for operation of a building information modelling (BIM) functionality in a construction site management system, the method comprising:
providing by a server a three-dimensional gross model of a construction site, the gross model having a highly detailed texture, the server storing a work package, wherein the work package comprises relational information on a task to be performed, the work package being assigned from the server to the mobile device, the work package comprising references to locations within the gross model,
deriving a three-dimensional net model from the gross model by processing the gross model based on an analysis of the work package, wherein the derived net model comprises varying degrees of detail, wherein the degrees of detail in the net model are related to the relational information on the task in the work package, wherein parts of the net model related to relational information in the work package appearing first are provided in greater detail than parts of the net model related to relational information in the work package appearing second, wherein appearing first and appearing second relate to an order of appearance according to which the task is to be fulfilled, wherein the derived net model comprises detailed data of the locations referenced to the work package and detail-reduced data of the construction site apart from the locations referenced to the work package,
retrieving with the mobile device the net model from the server, and
providing on the mobile device the net model as a graphical user interface (GUI) on a screen of the mobile device.

13. The method according to claim 12, wherein deriving the net model is carried out with the server or the mobile device.

14. The method according to claim 12, further comprising:
adding attributes to the net model by the server, the attributes comprising references to locations within the net model.

15. The method according to claim 14, wherein the attributes comprise one or more of:
instructions, manuals, notes, warning signs, accentuations, and graphical animations.

16. A computer programme product comprising programme code which is stored on a non-transitory machine-readable medium, or being embodied by a programme code segment, and having computer-executable instructions for performing the steps of a method according to claim 12.

17. The method according to claim 12, wherein the work package includes information for a construction task, the information including:
time for the construction task;
a person or tool to perform the construction task; or
manual instructions, tips, or warnings related to the construction task.

18. The method according to claim 12, comprising the server providing the net model to the mobile device, the net model being adapted through a learning process, wherein the learning process adapts the amount of details provided over time.

19. A construction site management system with building information modelling (BIM) functionality, the system comprising:
a server configured for maintenance of a three-dimensional gross model of a construction site, the gross model having a highly detailed texture, the server storing a work package, wherein the work package comprises relational information on a task to be performed, the work package being assigned from the server to a mobile device, the work package comprising references to locations within the gross model;
a mobile device connected to the server,
wherein the server is configured to derive a three-dimensional net model by processing the three-dimensional gross model based on an analysis of the work package, wherein the derived net model comprises varying degrees of detail, wherein the degrees of detail in the net model are related to the relational information on the task in the work package, wherein parts of the net model related to relational information in the work package appearing first are provided in greater detail than parts of the net model related to relational information in the work package appearing second, wherein appearing first and appearing second relate to an order of appearance according to which the task is to be fulfilled, wherein the derived net model comprises detailed data of the locations referenced to the work package and detail-reduced data of the construction site apart from the locations referenced to the work package,
wherein the mobile device is configured to retrieve the net model from the server and provide the net model on a screen as a graphical user interface (GUI)
wherein the server is configured to:
add attributes to the net model, the attributes comprising references to locations within the net model, the attributes comprise one or more of instructions, manuals, notes, warning signs, accentuations, and graphical animations,
retrieve user parameters from the mobile device, the user parameters relating to work packages carried out by the worker,
update a user database based at least in part on the user parameters,
obtain stem user parameters which are stored on the server or retrieved from the mobile device, the stem user parameters relating to a basic qualification level of the worker,
retrieve device parameters from the mobile device, the device parameters relating to sensor data collected with the mobile device and based at least in part on the behavior of the worker, and
generate the instructions with a level-of-detail which is based at least in part on the updated user database and on the stem user parameters and on the device parameters, wherein the mobile device is configured to retrieve the instructions from the server.

20. The system according to claim 19, further comprising:
a non-transitory machine-readable medium having computer-executable instructions for performing the steps of a method comprising:
deriving a three-dimensional net model by processing the three-dimensional gross model based on an analysis of the work package, the net model comprising detailed data of the locations referenced to the work package and detail-reduced data of the construction site apart from the locations referenced to the work package,
adding attributes to the net model, the attributes comprising references to locations within the net model, the attributes comprise one or more of instructions, manuals, notes, warning signs, accentuations, and graphical animations,
retrieving user parameters from the mobile device, the user parameters relating to work packages carried out by the worker,
updating a user database based at least in part on the user parameters,
obtaining stem user parameters which are stored on the server or retrieved from the mobile device, the stem user parameters relating to a basic qualification level of the worker,
retrieving device parameters from the mobile device, the device parameters relating to sensor data collected with the mobile device and based at least in part on the behavior of the worker, and
generating the instructions with a level-of-detail which is based at least in part on the updated user database and on the stem user parameters and on the device parameters, wherein the mobile device is configured to retrieve the instructions from the server.

21. The system according to claim 19, wherein the work package includes information for a construction task, the information including:
time for the construction task;
a person or tool to perform the construction task; or
manual instructions, tips, or warnings related to the construction task.

22. The system according to claim 19, wherein the server is configured to provide the net model to the mobile device, the net model being adapted through a learning process, wherein the learning process adapts the amount of details provided over time.

23. A construction site management system with building information modelling (BIM) functionality, the system comprising:
a server configured for maintenance of a three-dimensional gross model of a construction site, the gross model having a highly detailed texture, the server storing a work package, the work package being assigned from the server to a mobile device, the work package comprising references to locations within the gross model;

a mobile device connected to the server, wherein the server is configured to derive a three-dimensional net model by processing the three-dimensional gross model based on an analysis of the work package, the net model comprising detailed data of the locations referenced to the work package and detail-reduced data of the construction site apart from the locations referenced to the work package, wherein the mobile device is configured to retrieve the net model from the server and provide the net model on a screen as a graphical user interface (GUI), wherein the server is configured to provide the net model to the mobile device adapted through a learning process, wherein the learning process adapts the amount of details provided over time.

* * * * *